(12) United States Patent
DiChiara

(10) Patent No.: US 7,543,930 B2
(45) Date of Patent: Jun. 9, 2009

(54) ADAPTOR FOR SECURING EYEWEAR LENSES TO A FRAME AND A METHOD OF USING THE SAME

(75) Inventor: Carmine S. DiChiara, Warren, NJ (US)

(73) Assignee: Liberty Sport, Inc., Fairfield, NJ (US)

( * ) Notice: Subject to any disclaimer, the term of this patent is extended or adjusted under 35 U.S.C. 154(b) by 0 days.

(21) Appl. No.: 11/895,459

(22) Filed: Aug. 24, 2007

(65) Prior Publication Data

US 2009/0051866 A1 Feb. 26, 2009

(51) Int. Cl.
*G02C 1/02* (2006.01)

(52) U.S. Cl. ........................................ 351/110; 351/106

(58) Field of Classification Search ................ 351/106, 351/103, 92, 86, 83, 96, 93, 124, 158, 41, 351/110
See application file for complete search history.

(56) References Cited

U.S. PATENT DOCUMENTS

| | | | | |
|---|---|---|---|---|
| 4,466,713 A | * | 8/1984 | Tanaka | 351/106 |
| 5,467,148 A | * | 11/1995 | Conway | 351/85 |
| 6,592,220 B1 | * | 7/2003 | Cheong | 351/106 |

* cited by examiner

*Primary Examiner*—Hung X Dang
(74) *Attorney, Agent, or Firm*—Frederick W. Dour; Frommer Lawrence & Haug LLP

(57) ABSTRACT

An adaptor to be affixed to an eyeglass lens and received in an eyeglass frame, to facilitate the fitting and replacement of various shapes of lenses into a variety of eyeglass frames, particularly, rimless and partial rim frames, wing frames, three-piece frames and frames with complex shapes.

24 Claims, 12 Drawing Sheets

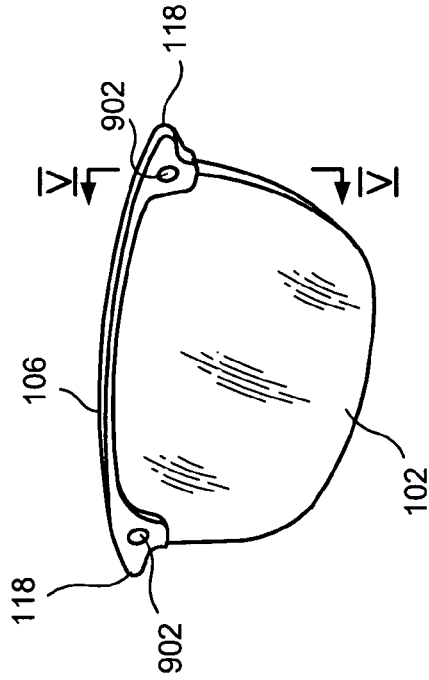
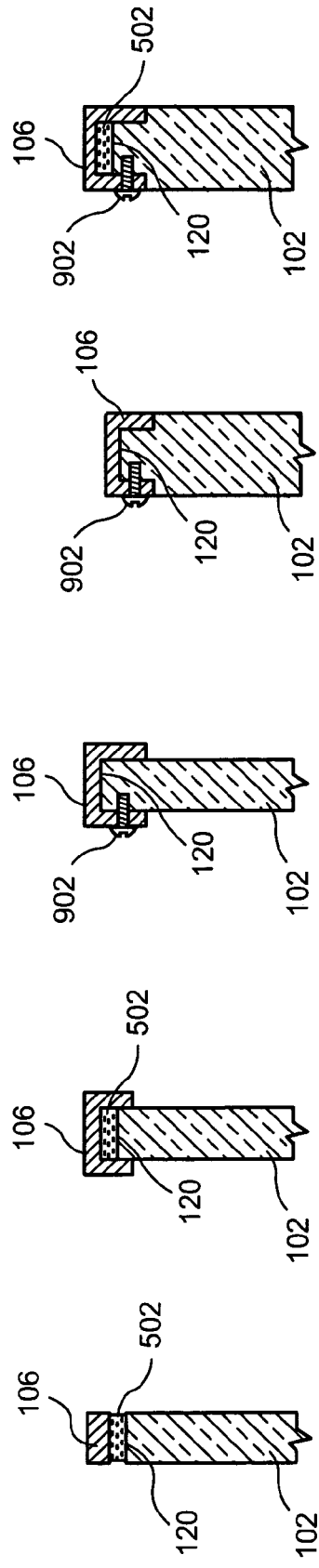

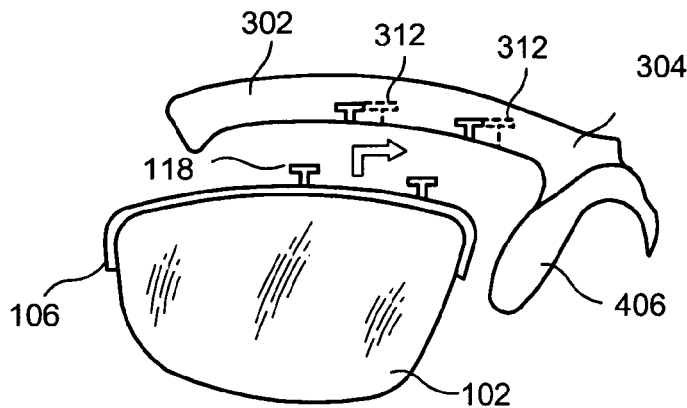
F I G. 6(a)
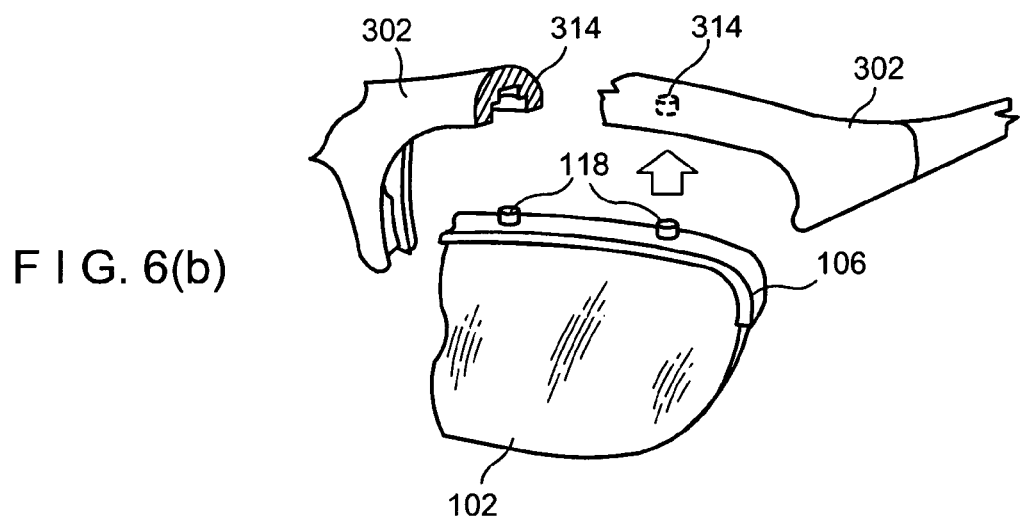
F I G. 6(b)
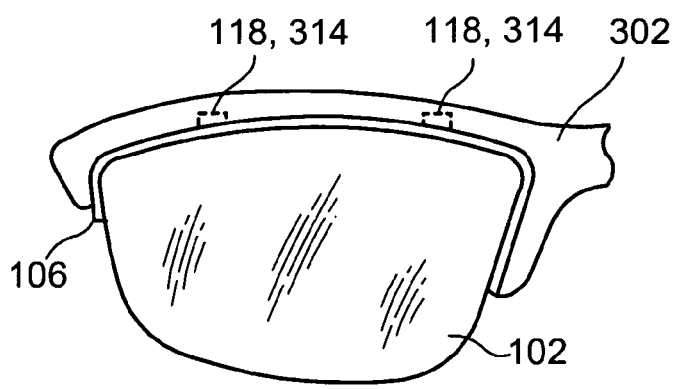
F I G. 6(c)

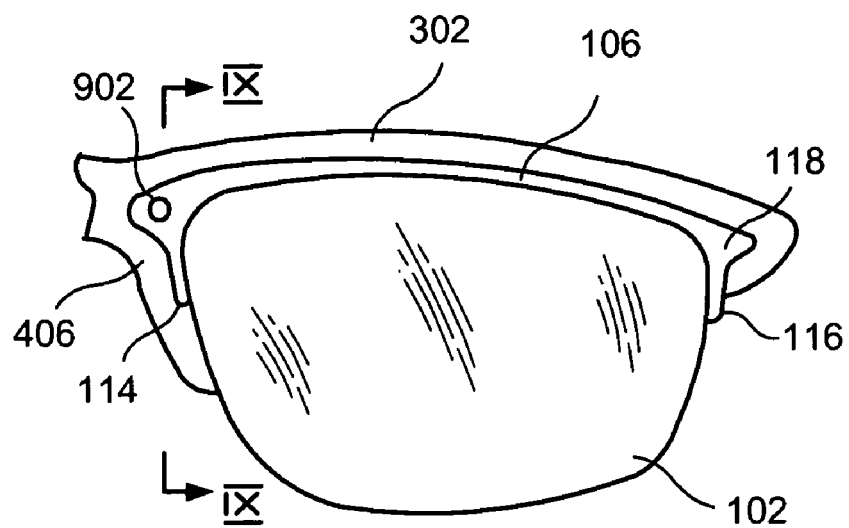
F I G. 9(a)
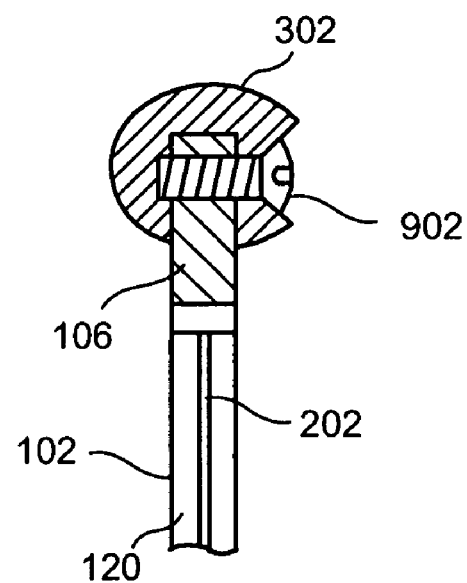
F I G. 9(b)

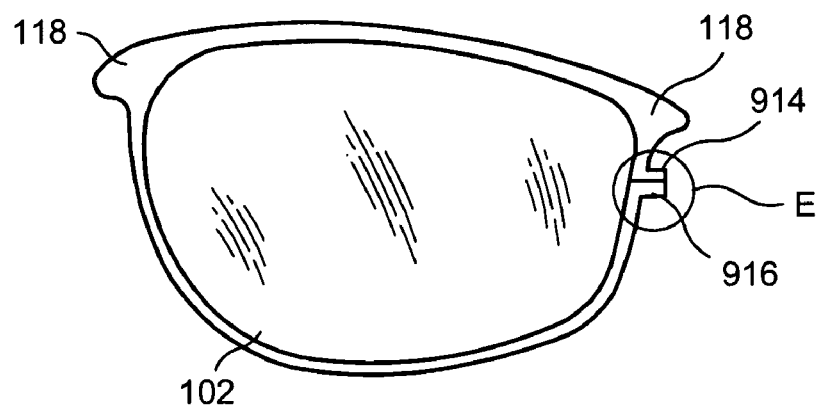
F I G. 10(a)
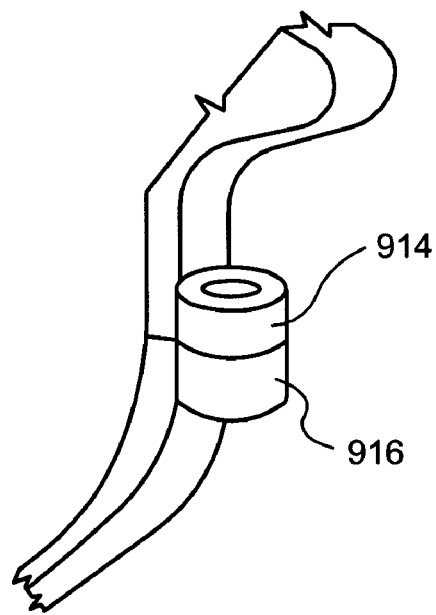
F I G. 10(b)

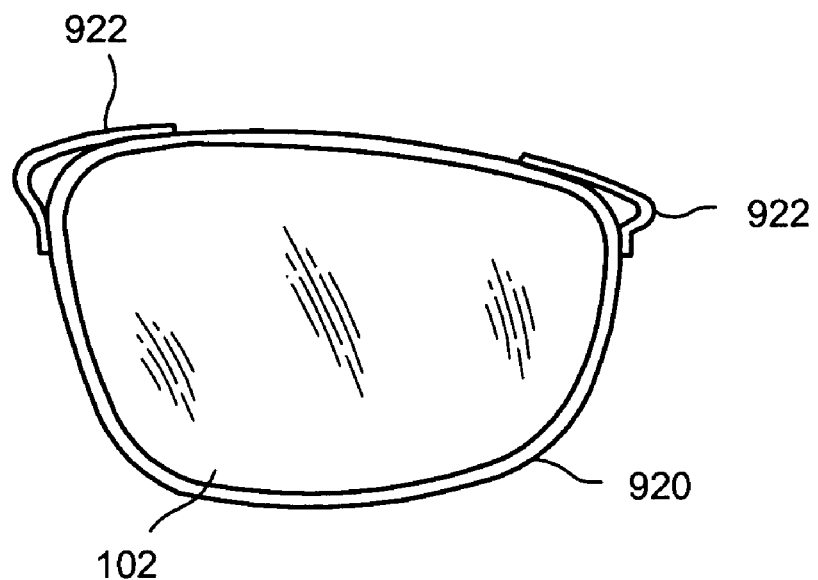
F I G. 11
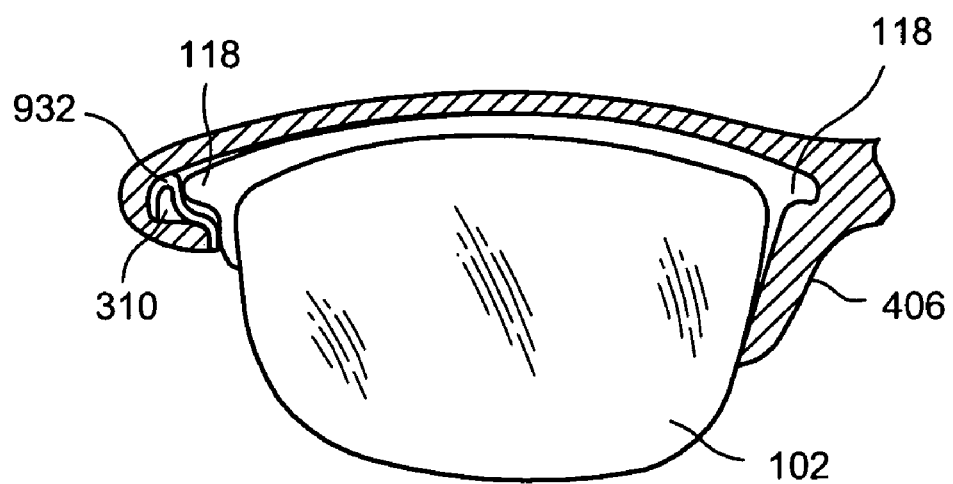
F I G. 12

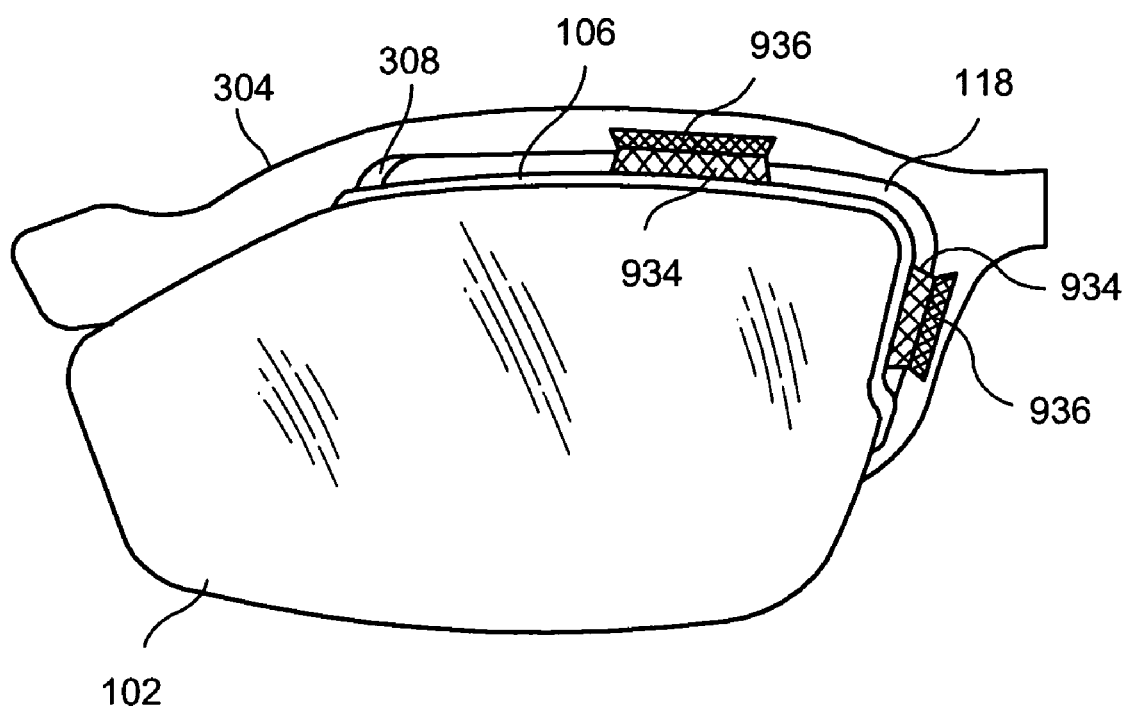
F I G. 16

ADAPTOR FOR SECURING EYEWEAR LENSES TO A FRAME AND A METHOD OF USING THE SAME

BACKGROUND

1. Field of the Invention

This invention relates generally to an adaptor for quickly and easily securing prescription eyeglass lenses to a frame. More particularly, the present invention is directed to an adaptor to be affixed to an eyeglass lens, and received in an eyeglass frame, to facilitate the fitting and replacement of complex-shaped prescription lenses to an eyewear frame.

2. Background Discussion

A typical pair of eyeglasses includes a pair of lenses or a single shield mounted to a frame that may include rims around the lens or lenses; a brow bar; a bridge piece or nose bridge connecting the inner ends of the rims or lenses; and two temple pieces attached to the outer ends of the rims or lenses for resting the glasses on the user. Typical full-rim frames have rims with one or more breaks in the rim with the free ends adapted to accept a threaded fastener such as a screw. Lenses are typically mounted in such eyeglass frames by using the screw or other fastening device to draw the free ends of the split frame together, thus tightening the rim around the lens. In the conventional configuration, the screw must be removed before the lens may be removed. Because of the size of the screw, the variety of screw configurations used in the field, the installation and removal tools required, and the specialized knowledge and skill required to properly replace a lens, removal and replacement of lenses is beyond the ability of the typical eyeglass wearer.

Eyewear designs have been directed to eyewear frames in which the lenses can be secured to the frame without resorting to a continuous rim, or with no rim at all, generally referred to as rimless frames. One type of rimless frame, the wing style, typically includes a brow bar, a temple piece secured to each end of the brow bar, and either a single shield or two separate lenses attached to the brow bar. The wing style frame can provide the appearance of the lenses being suspended from the brow bar, evoking a desirable athletic or sporty look. Because the wing style frame secures the lenses from the brow bar only, improved peripheral vision is achieved. Lenses used with wing style frames can be secured to the brow bar permanently with any known mechanical means or adhesive systems. The lenses may also be temporarily secured with an interacting system of mechanical components such that the lenses can be easily replaced in the frame. The mechanical components can be appropriately shaped recesses in the frame, shaped to accept notches on the lens, posts to interact with the notches, keyhole slots and co-acting T-shaped posts, snap fit components, barbed fittings, or any other co-acting fastener system known in the art. Additionally, magnets or magnetic material may be affixed to the lenses and/or the brow bar to removably attach the lenses to the frame. Such simple interlock or attachment mechanisms require no special tools to remove or install lenses. No special skill is needed in order to interchange the lenses, making the lenses replaceable by the typical wearer.

Another style which does not require a rim to secure the lens is known as the three-piece mount. In this style, the lenses are a structural component of the eyewear and no brow bar is needed. Temple pieces are secured directly to the lenses at an outer edge. A nose bridge is secured between the lenses adjacent to an inner edge of each lens, thus establishing the configuration of the eyewear. Because the lenses are a structural component of this type of eyewear, the attachment of the lenses to the temple pieces and nose bridge must be structurally sound. In many cases, the nose bridge and temple attachments are permanent to insure the structural integrity of the eyewear. Typically, replacement of the lenses in a three-piece frame requires the involvement of a skilled technician.

Plano lenses (lenses which do not contain specialized curvature for the correction of vision defects) for rimless frames can be manufactured efficiently with common techniques and equipment. Because there is no vision-correcting curvature in plano lenses, positioning of a lens with respect to the wearer's eyes is not critical. Accordingly, precise location of the notches is not necessary for plano lenses to serve their function as in, for example, tinted lenses for sunglasses or impact resistant lenses for safety glasses.

Prescription eyewear requires precise individualized placement of corrective lenses in the frame to achieve appropriate vision correction. In addition to cutting the lens with the proper corrective curvature, certain frame designs, such as wing style frames require lenses that incorporate the mounting system components, such as tabs or notches. Such mounting components must be accurately located on the lens to properly position the lens curvature with respect to the wearer's pupil. The cutting and preparation of such lenses for wing style frames requires a high precision, five-axis lens cutting system to properly configure the lenses. This is an expensive process requiring highly skilled technicians and specialized equipment that is not readily available in the market and is prohibitively expensive for most prescription lens makers and dispensers. Even with the most modern manufacturing techniques and equipment, the process for cutting prescription lenses with appropriate mounting elements typically results in a high percentage of rejected lenses due to limitations in materials and methods. The significant spoilage further increases costs. The adaptor of the present invention allows for more conventional equipment to be used to cut and properly align the lenses with the wearer's eyes when inserted into an eyeglass frame. If the adaptor of the present invention is used for lens mounting and frame assembly, all that the dispenser needs to do is to cut the prescription lens blank to its proper shape and desired lens centering position using conventional lens cutting techniques and equipment.

Rimless frames, particularly wing frames and those intended for athletic wear, are typically designed with complex curvatures to the brow bar. The overall contour of the eyewear imparts a sleek, aerodynamic appearance and a fashionable configuration. Lenses for such frames must have similar curvatures to insure proper fit and function and to achieve the desired aesthetics. Such lenses obviously have complex shapes at least at the interface between the lens and the brow bar. Lenses with complex curves are more difficult and expensive to produce than simpler, more generic, shaped lenses. These special shaped lenses are often special order items with significant lead times. A broken lens can cause an inconvenience for eyeglass wearers because of the delay in receiving a replacement lens.

Conversely, an inventory of the more common shaped lenses is often maintained by eye care professionals at retail locations or at optical labs, and can readily be produced. Thus, a more common shaped lens can be easily obtained, at a lower cost, for initial fitting in a pair of prescription eyeglasses or to replace missing or damaged lenses. Traditionally, these lenses have been unavailable for fitting into rimless frames or frames with more complex shapes.

Because of the difficulties in manufacturing mentioned above, the benefit of rimless frames with easily replaceable lenses have had limited availability and, when obtainable, were only available at high cost. Because of the limited availability of such lenses, an unmet need exists in many markets for easily replaceable prescription lenses for rimless frames.

Prior inventions attempted to circumvent these difficulties by providing prescription lenses attached to the back of the eyewear frame. The additional lenses added weight, complexity and compromising the aesthetics of the wing style frame. Such designs have not been widely accepted for these reasons.

Therefore, it would be an advancement in the state of the art to provide an inexpensive and efficient system for securing lenses, including in particular prescription lenses to rimless frames, wing type frames and frames of varying design and dimension, that does not require expensive and time consuming lens preparation, cutting and finishing before assembly and glazing into an eyeglass frame. It would further advance the state of the art to provide easily interchangeable lenses for rimless frames.

SUMMARY OF THE INVENTION

It is therefore a principle object of the present invention to provide an adaptor to allow simplified, convenient and efficient mounting of lenses in rimless frames, which could also result in reduced costs.

A further aspect of the present invention is directed to a mounting system for rimless eyewear frames in which the lenses are easily replaceable.

A further aspect of the present invention is directed to an adaptor to allow inexpensive and efficient mounting of prescription lenses in rimless frames.

Yet another aspect of the present invention is directed to an adaptor to allow inexpensive and efficient mounting of lenses with standard shapes and profiles in rimless frames.

Yet another aspect of the present invention is directed to a mounting system for rimless eyewear frames which allows lenses with standard profiles and shapes to be fitted to frames.

Yet another aspect of the present invention is directed to a mounting system for rimless eyewear frames which allows lenses with standard profiles and shapes to be fitted to frames with complex shapes.

Yet another aspect of the present invention is directed to a mounting system for rimless eyewear frames which allows prescription lenses to be mounted easily.

Yet another aspect of the present invention is directed to a mounting system for rimless eyewear frames which allows prescription lenses to be easily replaced by the wearer.

Yet another aspect of the present invention is directed to an eyewear frame and an adaptor configured to facilitate mounting of generic shaped lenses in eyewear frames comprising complex profiles.

These and other objects and advantages are provided by the instant invention. In this regard, the instant invention is directed to an apparatus and/or a method for securing eyewear lenses to a frame in which an adaptor is securely affixed to a lens.

In this text, the terms "comprising", "comprise", "comprises" and other forms of "comprise" can have the meaning ascribed to these terms in U.S. Patent Law and can mean "including", "include", "includes" and other forms of "include".

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, wherein like reference numerals denote like elements and parts, in which:

FIG. 5(a) illustrates an attachment member affixed to a lens according to one aspect of the instant invention;

FIG. 5(b) illustrates an attachment member affixed to a lens according to another aspect of the instant invention;

FIG. 5(c) illustrates an attachment member affixed to a lens according to another aspect of the instant invention;

FIG. 5(d) illustrates an attachment member affixed to a lens according to another aspect of the instant invention;

FIG. 5(e) illustrates an attachment member affixed to a lens according to another aspect of the instant invention;

FIG. 5(f) illustrates an attachment member affixed to a lens according to another aspect of the instant invention;

FIG. 6(a) illustrates protrusions according to one aspect of the instant invention;

FIG. 6(b) illustrates protrusions according to another aspect of the instant invention;

FIG. 6(c) illustrates an assembled rimless frame, lens and adaptor using protrusions according to an aspect of the instant invention;

FIG. 9(a) illustrates a cutaway view of a wing style rimless frame with an adaptor securely mounted in the frame with a mechanical fastener such as a screw. The mechanical fastener may comprise any other appropriate method of mounting to hold the lens and adaptor assembly to the frame securely and allow it to be removed if so desired;

FIG. 9(b) illustrates an enlarged, cross sectional view of the frame, lens, adaptor, and fastener taken along line IX-IX.

FIG. 10(a) illustrates an alternate embodiment of an adaptor providing the look of a full rim frame according to one aspect of the instant invention;

FIG. 10(b) illustrates an enlarged view of the portion of FIG. 10(a) indicated as E;

FIG. 11 illustrates an alternate embodiment of an adaptor according to one aspect of the instant invention; and FIG. 12 depicts a cutaway view of a wing style rimless frame with a recess fitted with a mechanical component.

FIG. 16 is a partial cut-away of a portion of an eyewear frame showing an alternate attachment method of the present invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not a limitation of the invention. In fact, it will be apparent to those skilled in the art that various modifications, combination, additions, deletions and variations can be made in the present invention without departing from the scope or spirit of the invention. For instance, features illustrated or described as part of one embodiment can be used in another embodiment to yield a still further embodiment. It is intended that the present invention covers such modifications, combinations, additions, deletions and variations as come within the scope of the appended claims and their equivalents.

The invention is directed to an adaptor for eyewear lenses to be easily fitted to wing, partial-rim or three-piece (hereinafter referred to as a group as "rimless") eyewear frames. Rimless frames are well known in the art. Wing style lenses are traditionally used with frames that comprise a brow bar and temple pieces. The lenses are mounted to the brow bar with the use of protrusions on the lens and matching recesses or notches on the frame. Wing style lenses are easily interchangeable, but production of prescription wing style lenses is costly due to the lack of readily available equipment. Lenses for partial-rim and three-piece frames are also costly and are not typically replaceable by the user.

Figure 1A:
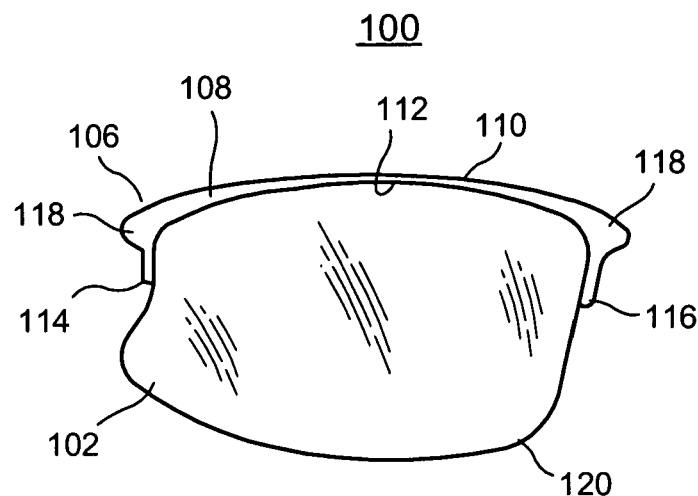
FIGS. 1(a), 1(b) and 1(c) illustrate an adaptor according to one aspect of the instant invention affixed to lenses of different shape with a filament prior to insertion into an eyeglass frame.
Figure 1B:
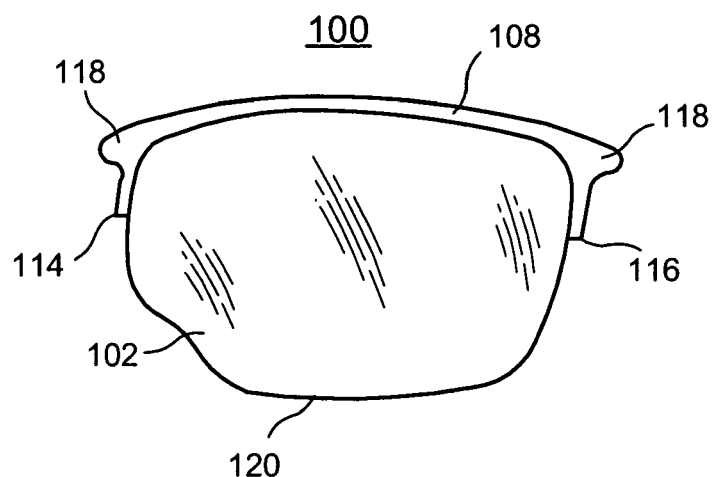
Figure 1C:
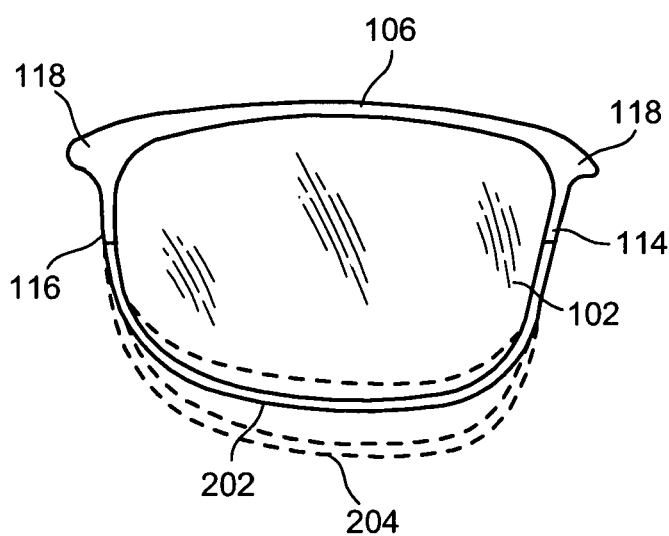

Referring to FIGS. 1(a) and 1(b), an optical lens 102 is shown fitted with an adaptor 106 to mount the lens assembly 100 in an eyewear frame (not shown). The adaptor 106 comprises an insert portion 108, a top surface 110, a bottom surface 112 to abut an upper surface of a lens 102, a first end 114, a second end 116, and at least one protrusion 118 to engage in the eyewear frame (not shown). The adaptor 106 is configured for edge mounting on the lens 102 and extending at least partially around the circumferential edge 120. The adaptor 106 can be affixed to the lens with any method or combination of methods known in the art. For example, FIG. 1(c) illustrates an embodiment for mounting the adaptor 106 to the lens 102 using a filament 202. The filament 202 is secured to a first end 114 of the adaptor 106 and to a second end 116 of the adaptor 106. As shown, filament 202 can be deformable between a rest position, depicted in solid line as element 202, to an deformed position 204 shown in phantom. The filament 202 can be made from a elastic or deformable polymer, elastomer, or other deformable material.

Figure 4:
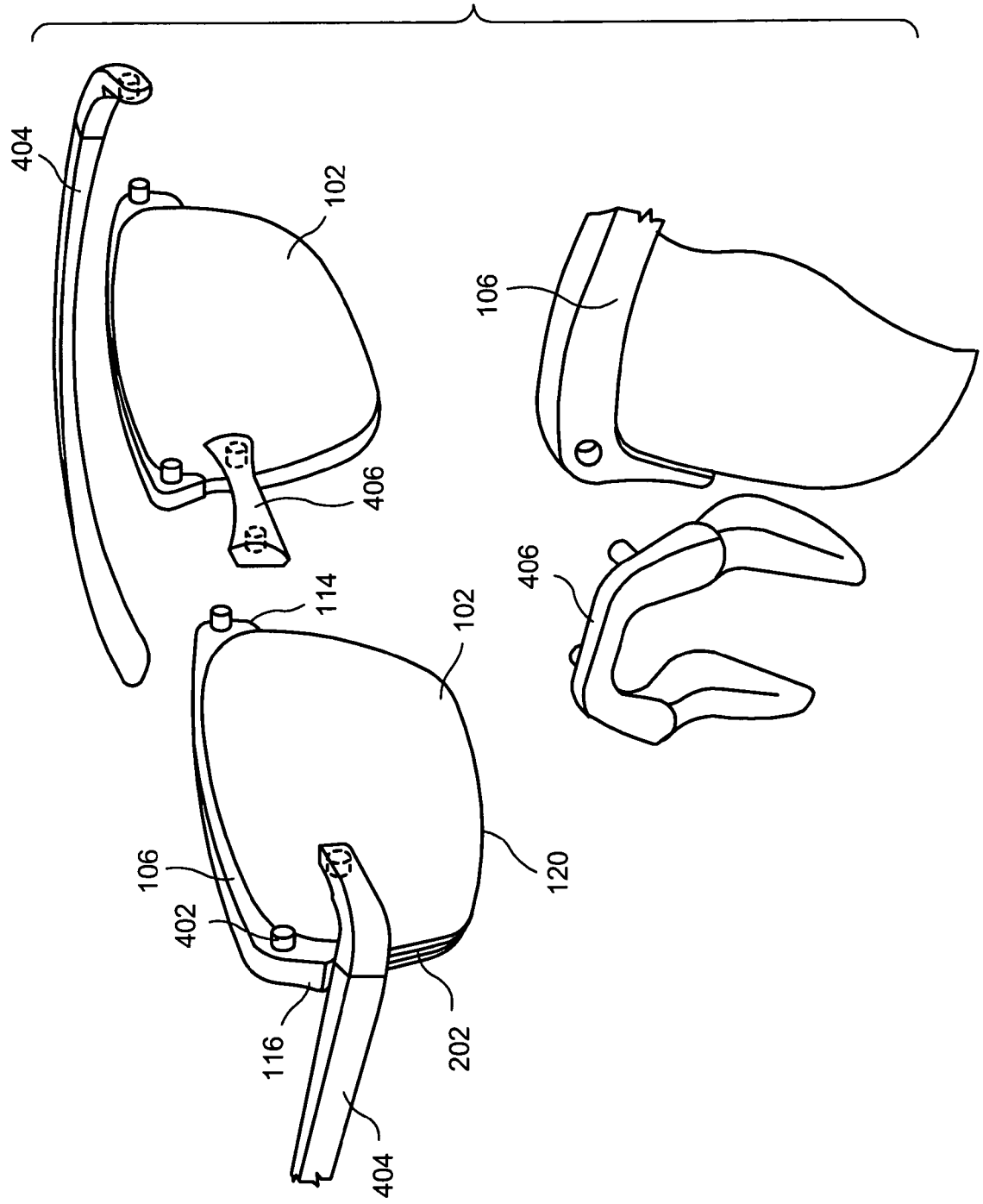
FIG. 4 is an exploded view of an exemplary three-piece eyewear frame with adaptors according to one aspect of the instant invention.

FIG. 4, shows an alternate embodiment for mounting an adaptor using a filament 202. The filament 202 is secured to a second end 116 of the adaptor 106, and encircles the lens 102 along circumferential edge 120, terminating at a first end 114 of the adaptor 106, securing the adaptor 106 to the lens 102. The filament 202 may be made from any appropriate material such as metallic wire, a polymeric material such as a nylon or an elastic or deformable elastomer.

Figure 2:
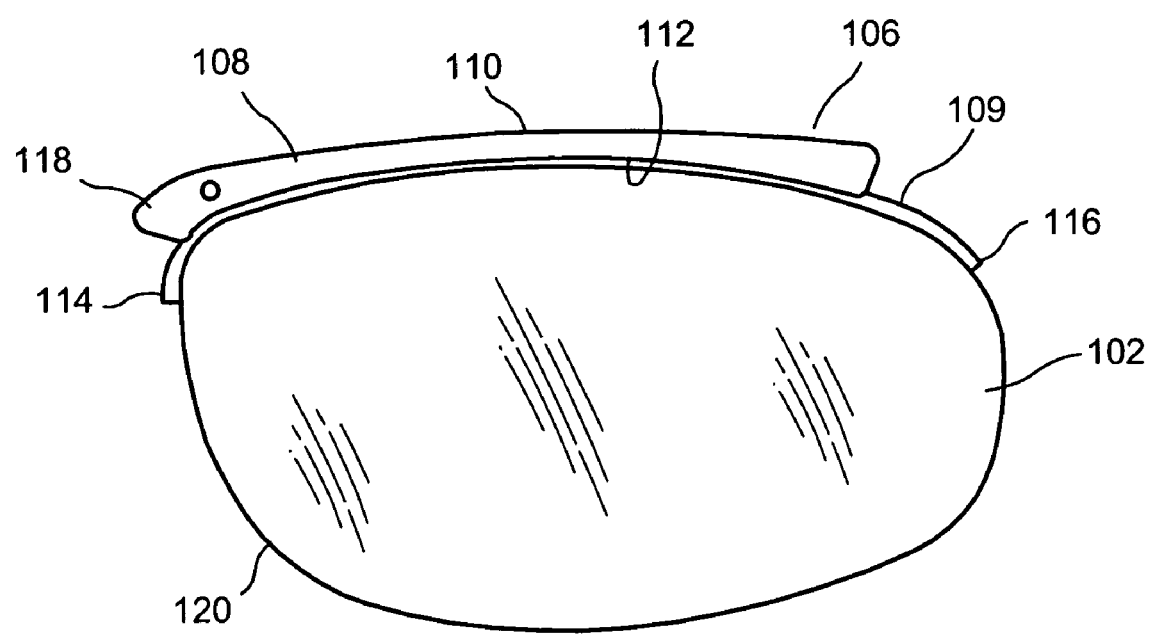
FIG. 2 illustrates an adaptor of another aspect of the instant invention as shown affixed to a lens with a filament prior to insertion into an eyeglass frame.

FIG. 2 shows another embodiment of the adaptor 106 having a partial lens rim portion 109. The optical lens 102 is shown fitted with an adaptor 106 to mount the lens assembly 100 in an eyewear frame (not shown). The adaptor 106 comprises an insert portion 108, a top surface 110, a partial lens rim portion 109 to abut an upper surface of a lens 102, a first end 114, a second end 116, and at least one protrusion 118 to engage in the eyewear frame (not shown). The adaptor 106 is configured for edge mounting on the lens 102 and the partial lens rim portion extends at least partially around the circumferential edge 120 of the lens 102. The adaptor 106 with partial lens rim portion 109 is affixed to the lens with any method or combination of methods known in the art.

Additional attachment members are illustrated in FIGS. 5(a) through 5(f). FIG. 5(a) illustrates an adaptor 106 with at least one protrusion 118. The adaptor 106 is placed generally atop a lens 102 and secured to the lens 102 with at least one mechanical fastener 902. FIGS. 5(b) through 5(f) are cross-sectional views of the adaptor 106 on the lens 102 taken generally along line V-V. FIG. 5(b) illustrates the use of an adhesive system 502 to secure the adaptor 106 to a circumferential edge 120 of lens 102. The adhesive systems used may be comprised of a permanent adhesive or removable adhesive such as an adhesive tape. FIGS. 5(c) through 5(f) illustrate an adaptor 106 of a generally C-shaped cross section according to one aspect of the instant invention. The adaptor 106 may be attached to the lens 102 with adhesive 502 as in FIG. 5(c), with mechanical fasteners 902 as shown in FIGS. 5(d) and 5(e), or a combination of adhesive 502 and mechanical fasteners 902 as shown in FIG. 5(f). The fasteners shown in cross-section in FIGS. 5(d) through 5(f) are illustrative of the fasteners 902 showed in FIG. 5(a). It would be obvious to one skilled in the art that many configurations are possible for the cross section for adaptor 106. Additionally, many combinations of adhesive, mechanical fasteners, or other attachment members would be obvious to an artisan and would be within the spirit of the instant invention.

Figure 3:
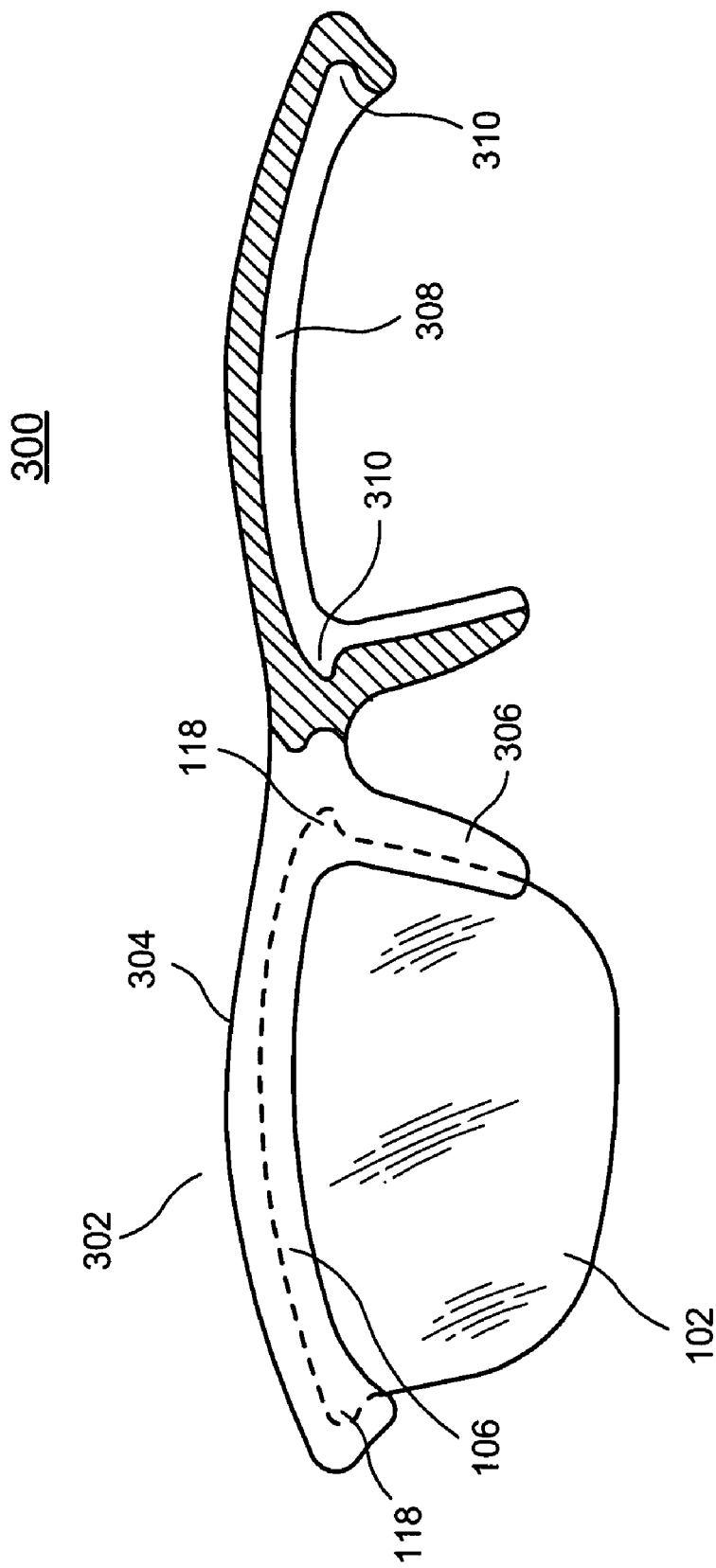
FIG. 3 is a front, partial curt-away view of a pair of wing style rimless eyewear frames fitted with an adaptor according to one aspect of the instant invention; the other half of the partial cut-away illustrates the frame with lens channel not fitted.

FIG. 3 shows a front, partial cutaway view of a wing style rimless frame 302 with one lens 102 mounted in the frame 302. The wing style frame 302 comprises a brow bar 304 and an integral nosepiece 306. The wing style frame 302 comprises a brow bar 304 and an integral nosepiece 306. Within the brow bar 304 are lens channels 308 for the left and right lens, each channel 308 configured with a pair of recesses 310 to accept a pair of protrusions 118 on an adaptor 106 (both shown in phantom) for each lens 102. While this illustration shows a pair of protrusions and recesses, it would be obvious to one skilled in the art that the lens could be configured for one or more protrusions and the frame configured for one or more recesses and still be within the scope of the instant invention.

As shown in FIG. 12, the recesses 310 may contain a mechanical component 932 to provide additional durability as well as to provide an alternate means of inserting, removing and replacing a lens more conveniently in securing the adaptor 106 in the recess 310. The mechanical component 932 may be a metallic or non-metallic resilient member configured to deflect upon insertion of the protrusion 118. In an exemplary embodiment, a mechanical component 932 may deflect under a lower force upon insertion of the protrusion 118 than is required to deflect the component 932 to effect removal of the lens.

FIG. 4 illustrates an exemplary three-piece frame with adaptors 106 according to one aspect of the instant invention. Adaptor 106 is secured to lens 102 through the use of a filament 202 for illustration purposes. The adaptor 106 may be secured to the lens 102 in any method known in the art, including, for example, adhesive systems, sonic welding, friction fit, snap fit, or through the use of mechanical fasteners. Adaptor 106 is configured with protrusions 402 adapted for secure attachment to the temple pieces 404 and the nose bridge 406.

Additionally, FIG. 9 illustrates a permanent installation of a lens 102 and adaptor 106 into a rimless frame 302. This installation can be considered permanent because the mechanical fastener 902 prevents removal of the lens 102 from the frame without the use of a tool. This would preclude removal of the lens by the typical wearer. It would be obvious to one skilled in the art that a threaded fastener is only one of the many mechanical fasteners suitable for additional mounting security of the adaptor 106 into the frame 302. Other fasteners, for example, pins, rivets, or barbed fittings, alone or in combination, with or without adhesive systems, could be used to permanently secure the adaptor 106 to the frame 302. For clarity, FIG. 9(b) offers a cross sectional view of the lens 102, adaptor 106 and frame 302 along line IX-IX of FIG. 9(a). Here the relationship of the mechanical fastener 902, the adaptor 106 and the frame 302 can be clearly seen.

Various embodiments of protrusions and recesses within the scope of the instant invention are illustrated in FIGS. 6(a) through 6(c). FIG. 6(a) illustrates an adaptor 106 according to one aspect of the instant invention configured with T-shaped protrusions 118 configured to interact with T-shaped recesses 312 formed in the rimless frame 302. FIG. 6(b) is an exploded view of a lens 102 fitted with an adaptor 106 upon which cylindrical shaped protrusions 118 are configured for a friction fit with appropriately configured cylindrical recesses 314 in the rimless frame 302. FIG. 6(c) illustrates an assembled lens 102 and adaptor 106 mounted in a rimless frame 302 similar to that illustrated in FIG. 6(b).

Figure 7:
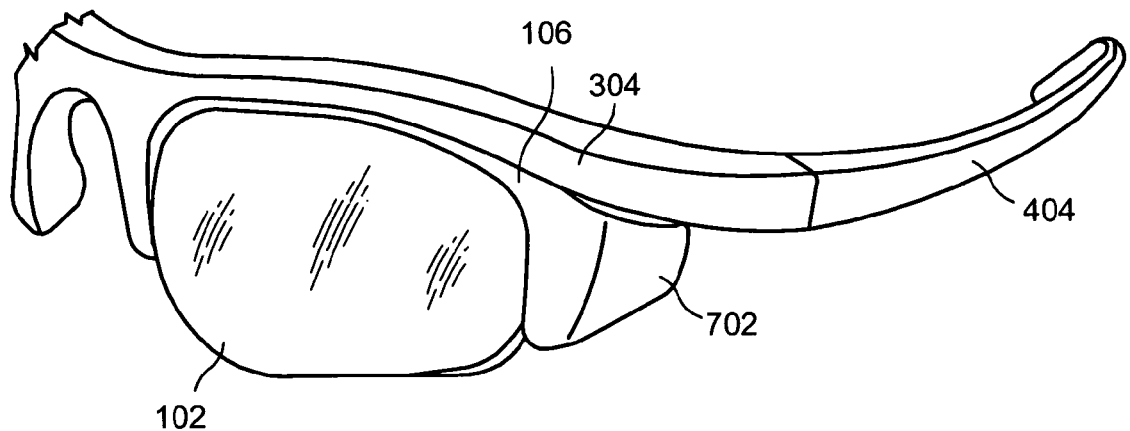
FIG. 7 illustrates an alternate embodiment of an adaptor with an added safety feature according to one aspect of the instant invention.

FIG. 7 is illustrative of another embodiment in accordance with the instant invention. Lens 102 is fitted with adaptor 106, and mounted to brow bar 304. As illustrated, the adaptor 106 has extended temporal protection provided by a shield portion 702 which provided additional protection from the intrusion of debris or wind between the lens 102 and the wearer's eye.

Figure 8:
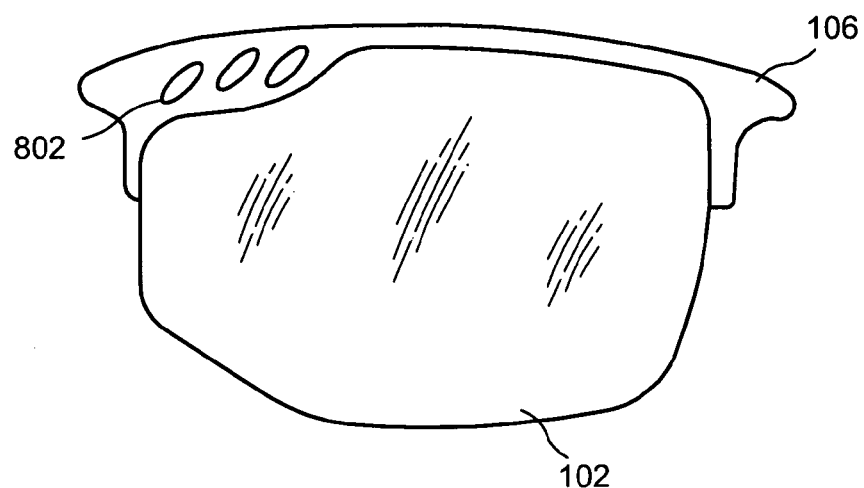
FIG. 8 illustrates another alternate embodiment of the adaptor with ventilation ports according to one aspect of the instant invention.

FIG. 8 illustrates an adaptor 106 according to another aspect of the instant invention with venting ports 802 to provide circulation of air between the lens 102 and the wearer's face FIGS. 10(a) and 10(b) illustrates a one-piece adaptor 910 according to one aspect of the instant invention. As illustrated, the adaptor provides the look of a full rim frame, including the split rim with first receptacle end 914 and second receptacle end 916 adapted to accept a fastener (not shown) as known in the art. The fastener draws the receptacle ends 914 and 916 towards each other, securing the lens 102. Protrusions 118 interact with recesses provided in the frame as described above, and shown, for example, in FIG. 3.

FIG. 11 illustrates a continuous rim 920 with protrusions 922 according to another aspect of the instant invention. The continuous rim 920 is mounted in the lens 102 by any known method. The protrusions 922 engage with recesses in a frame (not shown) as described above, and shown, for example, in FIG. 3.

Figure 13:
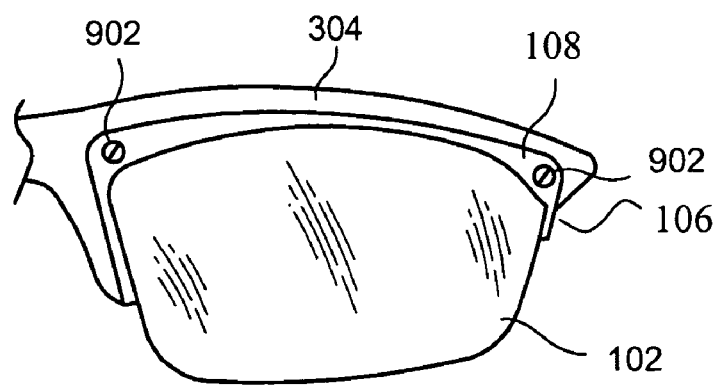
FIG. 13 illustrates an adaptor according to an embodiment of the present invention.

FIG. 13 illustrates an alternate embodiment of the adaptor 106 mounted upon an lens 102, in which the attachment of the adaptor 106 to the brow bar 304 is achieved through the use of an insert portion 108 and mechanical fasteners 902. In this embodiment, the insert portion 108 of the adaptor 106 does not have protrusions to secure the lens and adaptor to the frame. Such an alternate method allows for the permanent or securely removable attachment of the adaptor 106 to the eyewear frame by mechanical means such as screws or rivets.

Figure 14:
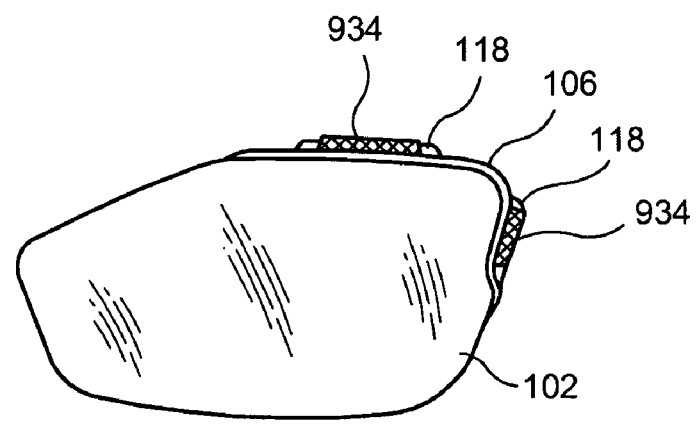
FIGS. 14 and 15 illustrate an alternate attachment embodiment for securing the adaptor to the frame of the instant invention.

An attachment method according to one embodiment of the present invention is illustrated in FIG. 14, in which at least one protrusion 118 of the adaptor 106 is comprised of a magnetic material 934. The magnetic material 934 in the adaptor 106 and appropriately placed co-acting magnetic material in the frame (not shown) magnetically interact to provide the attractive force required to secure the adaptor 106 to the frame (not shown). The adaptor 106 may be comprised wholly or partially of a magnet or a magnetic material. Further, the co-acting material of the frame may be comprised wholly or partially of a magnet or a magnetic material.

Figure 15:
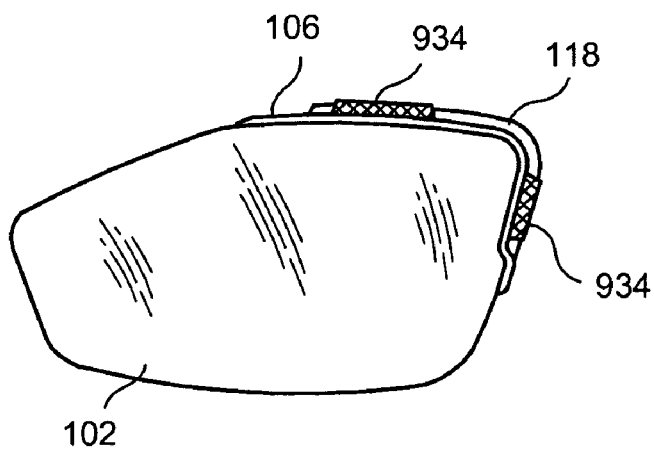

FIG. 15 is illustrative of an alternate embodiment of the instant invention which employs magnet material 934. The adaptor 106 comprises at least one protrusion 118 adapted for at least partial circumferential edge mounting on the lens 102 in any manner known to the art. At least one location within or portion of the protrusion 118 is a magnetic material 934, contained substantially within the adaptor 106. The attractive force between the magnetic material 934 and a corresponding magnetic material within the frame (not shown) provides the force for securing the lens 102, within the adaptor 106, to the frame (not shown).

FIG. 16 is a partial cut-away view of a brow bar 304, further illustrating the adaptor 106 and lens 102 shown in FIGS. 14 and 15. As shown, the brow bar 304 comprises a lens channel 308 in which at least one deposition of magnetic material 936 is located. The magnetic material 936 is located and configured to interact with corresponding magnetic material 934 in the adaptor 106. The magnetic attraction of the two magnetic materials 934 and 936 is sufficient to secure the lens 102 and adaptor 106 to the brow bar 304.

Operation of the instant lens mounting adaptor will now be described in detail for a wing style frame 300 as illustrated in FIG. 3. As depicted in FIGS. 1(a), 1(b) or 2, a lens 102 is fitted with an adaptor 106. If the lens is a prescription lens, this fitting can be accomplished at any time after the cutting of the lens and at any point of the assembly of the eyeglass frame. As discussed above, the adaptor 106 can be affixed to the lens 102 using a filament 202, as shown, for example, in FIGS. 2 and 9(a), an adhesive 502 as shown in FIG. 5(b), a mechanical fastener 902 as shown in FIG. 5(d), or any additional attachment methods, alone or in combination.

Once mounted on the lens 102, the adaptor 106 and the lens 102 create a subassembly for final glazing of eyewear. This subassembly is easily handled, durable, and can be installed in eyewear, as in, for example, FIG. 3. To complete the installation, the subassembly is properly oriented for insertion into the rimless frame 302. A first upper end or edge of the adaptor 106 part of the subassembly, with or without a protrusion 118, is inserted into the corresponding lens channel 308 which may be configured with a recess for accepting a protrusion 118. Once properly located and partially installed, and while maintaining contact between the first upper end or edge and the lens channel 308, the second upper end or edge is brought into contact with an opposite surface of the rimless frame. As additional force is applied to the subassembly in the direction of the brow bar 304, the mating components temporarily deform until the subassembly is secured within the lens channel.

Removal of the subassembly as described above is achieved through reversing the assembly steps.

Assembly of alternate embodiments of the adaptor 106 configured with protrusions 118, such as depicted in FIGS. 6(a) and 6(b) is similarly achieved. For example, following mounting of the adaptor 106 to the lens 102 as in FIG. 6(a), the subassembly of the lens 102 and adaptor 106 is placed below the brow bar 304 such that the T-shaped protrusions 118 are located at the mouth of the recesses 312 Additional force toward the brow bar urges the T-shaped protrusions into the recess 312. Once initially installed, the subassembly is urged towards the nose bridge 406 to effectuate a secure fit between the subassembly and the brow bar. The motion of the subassembly with regard to the brow bar 304 is illustrated by the upward and dextral arrow in FIG. 6(a).

Similarly, in FIG. 6(b), the cylindrical protrusions 118 are placed adjacent to the cylindrical recesses 314. Additional force toward the brow bar forces the protrusions 118 to engage with the recesses 314, forming, for example, a friction fit.

Although preferred embodiments of the present invention and modifications thereof have been described in detail herein, it is to be understood that this invention is not limited to these precise embodiments and modifications, and that other modifications and variations may be effected by one skilled in the art without departing from the spirit and scope of the invention as defined by the appended claims.

What is claimed is:

1. An eyewear apparatus for mounting a lens comprising:
a rimless eyewear frame, and
an adaptor comprising
a top surface,
a bottom surface,
a first end and a second end defining a length,
an insert portion; and
an attachment member for securely affixing said adaptor to said lens,
wherein said adaptor is configured to removably secure said lens to the rimless eyewear frame.

2. The apparatus of claim 1, wherein said bottom surface of said adaptor is configured for at least partial circumferential edge mounting on said lens.

3. The apparatus of claim 1, wherein said first end and second end are at opposite ends of said adaptor.

4. The apparatus of claim 1, wherein said insert portion has at least one protrusion.

5. The apparatus of claim 1, wherein said attachment member is a filament having two ends, wherein said first end of filament is secured to said first end of said adaptor, said second end of filament is secured to said second end of said adaptor, and wherein said filament is adapted to encircle a circumferential edge of said lens.

6. The apparatus of claim 5, wherein said filament is a polymeric material.

7. The apparatus of claim 5, wherein said filament is a metallic material.

8. The apparatus of claim 5, wherein said filament is an elastomer.

9. The apparatus of claim 1, wherein at least one component of said attachment member is an adhesive system.

10. The apparatus of claim 9 wherein said adhesive system is an adhesive tape.

11. The apparatus of claim 1, wherein at least one component of said attachment member is a mechanical fastener.

12. The apparatus of claim 1, wherein said insert portion comprises a magnet or a magnetic material.

13. A method of adapting a lens to be removably received into a rimless eyewear frame, wherein said rimless eyewear frame includes at least one lens channel, said method comprising the steps of:
affixing an adaptor to a lens wherein said adaptor comprises,
a top surface,
a bottom surface,
a first end and a second end defining a length,
an insert portion, and
an attachment member for securely affixing said adaptor to said lens; and
removably engaging said insert portion within said at least one lens channel of said rimless eyewear frame.

14. The method of claim 13 wherein,
said adaptor is removably secured in said lens channel.

15. The method of claim 13 wherein,
said adaptor is permanently secured in said lens channel.

16. The method of claim 13 wherein,
At least a portion of said lens channel comprises at least one magnet.

17. The method of claim 13 wherein,
at least a portion of said lens channel comprises at least one deposition of magnetic material.

18. A rimless eyewear frame comprising:
at least one brow bar, having distal ends, a top surface and a bottom surface,
at least one lens,
at least one adaptor for securing said lens to said rimless eyewear frames, and
two temple pieces pivotally attached to each distal end of said brow bar for supporting the rimless eyewear frame upon the wearer's face, wherein said bottom surface of said brow bar is configured to securely receive at least one adaptor for securing at least one lens to the rimless eyewear frame said adaptor comprising,
a top surface,
a bottom surface,
a first end and a second end defining a length,
an insert portion, and
an attachment member for securely affixing said adaptor to said lens, wherein said adaptor is configured to removably secure the lens to the rimless eyewear frame.

19. The rimless eyewear frame of claim 18 wherein at least a portion of said brow bar is comprised of a magnet.

20. The rimless eyewear frame of claim 18 wherein at least a portion of said brow bar is comprised of a magnetic material.

21. An eyewear frame comprising:
two optical lenses, each lens having an inner edge, an outer edge defining a width, an upper surface and a lower surface defining a height,
an adaptor at least partially circumferentially mounted on each said lens and at least partially spanning the width of each said lens along a circumferential edge,
a nose bridge removably secured to said adaptors proximate to said inner edge of each said lens, and
two temple pieces, each removably secured to each adaptor proximate to the outer edge of each lens for supporting the eyewear frame upon the wearer's face, said adaptor comprising,
a top surface,
a bottom surface, a first end and a second end defining a length,
an insert portion, and
an attachment member for securely affixing said adaptor to each said lens.

22. An eyewear apparatus for mounting a lens having a standard profile and shape comprising:
   a rimless eyewear frame, and
   an adaptor comprising
      a top surface,
      a bottom surface,
      a first end and a second end defining a length,
      an insert portion; and
      an attachment member for securely affixing said adaptor to said standard profile lens,
   wherein said adaptor is configured to removably secure said lens to said rimless eyewear frame.

23. The apparatus of claim 1 wherein the rimless eyewear frame has a complex shape.

24. The apparatus of claim 1 wherein the lens is a prescription lens.

* * * * *